US010324216B2

(12) United States Patent
Mack et al.

(10) Patent No.: US 10,324,216 B2
(45) Date of Patent: Jun. 18, 2019

(54) METHOD FOR FOREIGN OBJECT DETECTION FOR AN INDUCTION CHARGING DEVICE AND INDUCTION CHARGING DEVICE

(71) Applicant: Robert Bosch GmbH, Stuttgart (DE)

(72) Inventors: Juergen Mack, Goeppingen (DE);
Dragan Krupezevic, Stuttgart (DE);
Martin Gonda, Bühl (DE)

(73) Assignee: Robert Bosch GmbH, Stuttgart (DE)

( * ) Notice: Subject to any disclaimer, the term of this patent is extended or adjusted under 35 U.S.C. 154(b) by 105 days.

(21) Appl. No.: 15/516,168

(22) PCT Filed: Aug. 26, 2015

(86) PCT No.: PCT/EP2015/069499
§ 371 (c)(1),
(2) Date: Mar. 31, 2017

(87) PCT Pub. No.: WO2016/050423
PCT Pub. Date: Apr. 7, 2016

(65) Prior Publication Data
US 2017/0299754 A1  Oct. 19, 2017

(30) Foreign Application Priority Data

Oct. 1, 2014  (DE) .................. 10 2014 219 968

(51) Int. Cl.
*G01V 3/10* (2006.01)
*H02J 50/60* (2016.01)
(52) U.S. Cl.
CPC .............. *G01V 3/102* (2013.01); *H02J 50/60* (2016.02)
(58) Field of Classification Search
CPC .... G01V 3/10–108; H02J 50/10; H02J 50/60; H02J 7/025
See application file for complete search history.

(56) References Cited

U.S. PATENT DOCUMENTS

2011/0074346 A1  3/2011  Hall et al.
2013/0063160 A1  3/2013  Nakano et al.
(Continued)

FOREIGN PATENT DOCUMENTS

CN  102782985 A  11/2012
CN  103180758 A  6/2013
(Continued)

OTHER PUBLICATIONS

International Search Report for PCT/EP2015/069499, dated Nov. 17, 2015.

*Primary Examiner* — Huy Q Phan
*Assistant Examiner* — David B Frederiksen
(74) *Attorney, Agent, or Firm* — Norton Rose Fulbright US LLP; Gerard Messina

(57) ABSTRACT

A method for foreign object detection for an induction charging device is described, including an oscillator circuit, in particular, for a hand-held power tool, a resonance frequency and an associated actual quality of the oscillator circuit being detected and the actual quality is subsequently compared to a setpoint quality as a function of the resonance frequency and a decision is made about the presence of a foreign object based on a defined setpoint quality range. The method provides that an internal temperature of induction charging device is detected, in particular, during the wireless energy transmission, and the actual quality is multiplied by a correction factor based on the internal temperature. Also, an induction charging device is described that includes an oscillator circuit and a control and regulating unit, as well as at least one temperature sensor for carrying out the method.

12 Claims, 3 Drawing Sheets

(56) References Cited

U.S. PATENT DOCUMENTS

| | | | | |
|---|---|---|---|---|
| 2013/0162220 A1* | 6/2013 | Iijima | .................... | H02J 7/0052 |
| | | | | 320/137 |
| 2014/0015329 A1* | 1/2014 | Widmer | ............... | G01D 5/2006 |
| | | | | 307/104 |
| 2014/0021912 A1* | 1/2014 | Martin | .................... | B60L 58/12 |
| | | | | 320/109 |
| 2014/0091787 A1* | 4/2014 | Hyodo | .................... | G01V 3/105 |
| | | | | 324/236 |
| 2014/0180612 A1* | 6/2014 | Rejman | .............. | G01R 31/3627 |
| | | | | 702/58 |
| 2015/0115877 A1* | 4/2015 | Arai | ...................... | H02J 7/0042 |
| | | | | 320/108 |
| 2015/0355359 A1* | 12/2015 | Miyashita | ................ | H02J 7/025 |
| | | | | 324/207.16 |

FOREIGN PATENT DOCUMENTS

| | | | |
|---|---|---|---|
| CN | 103293463 | A | 9/2013 |
| CN | 103887893 | A | 6/2014 |
| DE | 4205344 | A1 | 10/1992 |
| DE | 102005014492 | A1 | 11/2005 |
| DE | 102004047189 | A1 | 4/2006 |
| DE | 102012205693 | A1 | 10/2013 |
| DE | 102012112953 | A1 | 6/2014 |
| DE | 102013226219 | A1 | 6/2014 |
| DE | 102013212588 | A1 | 12/2014 |
| JP | 2013059236 | A | 3/2013 |

\* cited by examiner

METHOD FOR FOREIGN OBJECT DETECTION FOR AN INDUCTION CHARGING DEVICE AND INDUCTION CHARGING DEVICE

FIELD OF THE INVENTION

The present invention relates to a method for foreign object detection for an induction charging device and an induction charging device.

BACKGROUND INFORMATION

It is known to wirelessly charge rechargeable battery-operated hand-held devices such as toothbrushes, mobile communication devices, electrically operated hand-held power tools or the like. For this purpose, an electromagnetic field is used for inductive energy transmission from an induction charging device to a rechargeable battery device of the hand-held device, the induction charging device and the rechargeable battery device each including a coil, which are positionable at a small distance from one another and thus together essentially form a transformer.

If an electrically conductive foreign object enters into the area of the electromagnetic field, eddy currents may form, which heat the foreign object. The foreign object, if it is magnetizable, may also be heated as a result of remagnetization losses or hysteresis losses. The heating may be substantial, so that an operational reliability of the inductive charging system is no longer ensurable. In addition, the foreign object may withdraw energy from the electromagnetic field, so that the energy transmission to the rechargeable battery device is disrupted.

An inductive charging system is known from German Published Patent Application No. 10 2012 205 693 A1, including an induction charging device for wirelessly transmitting energy to a rechargeable battery device, a resonance transformer of the induction charging device generating an alternating electromagnetic field with a charge coil. A determination unit is provided for detecting an object in the area of the charge coil as a function of an electrical parameter at the resonance transformer. In addition, the induction charging device includes a control and regulating unit for changing a quality factor of the resonance transformer, in order to permit an energy transmission in the case of a low quality factor and a detection of the object in the case of a high quality factor.

Furthermore, a method for foreign object detection for an induction charging device is known from unpublished German Published Patent Application No. 10 2013 212 588, in which a resonance frequency and an associated actual quality of an oscillator circuit of the induction charging device are detected and the actual quality is subsequently compared to a setpoint quality as a function of the resonance frequency. Based on a defined setpoint quality range, a decision is then made about the presence of a foreign object.

SUMMARY

An object of the present invention is to further improve the methods known from the related art for foreign object detection for an induction charging device as well as the corresponding induction charging devices, and to increase the detection accuracy of foreign objects.

ADVANTAGES OF THE INVENTION

According to the present invention, it is provided that the method for foreign object detection for an induction charging device detects an internal temperature of the induction charging device, in particular, during the wireless energy transmission, and multiplies the actual quality by a correction factor based on the internal temperature. The present invention also relates to an induction charging device including an oscillator circuit and a control and regulating unit, in particular for a hand-held power tool, for carrying out the method according to the present invention for foreign object detection, a temperature sensor integrated in the induction charging device detecting the internal temperature of the induction charging device. In this way, a more robust foreign object detection is possible, with the aid of which even small foreign objects may be detected largely irrespective of temperature influences.

In one advantageous embodiment, an upper limit and/or a lower limit of the setpoint quality range is multiplied by the inverse of the correction factor. As a result, a constant separation between the corrected actual quality and the limits of the setpoint quality range is achievable, which enables a simplified comparison for foreign object detection and a largely uniform accuracy of the foreign object detection irrespective of the resonance frequency.

The correction factor may be derived from the measured resistance of the at least one charge coil or alternatively or in addition, may be calculated based on the detected internal temperature, the correction factor being standardized for an average room temperature of, in particular, 25° C. to a value of 1.0. In this way, it is possible, to minimize or avoid foreign influences, which could distort the temperature detection.

In order to further improve the accuracy of the foreign objection detection, the profile of the correction factor levels off with respect to the actually detected temperatures at higher, in particular, internal temperatures, in particular, above room temperature.

The at least one temperature sensor is advantageously situated neither directly on a charge coil of the oscillator circuit nor directly in the vicinity of power switch elements and other self-heating components of the induction charging device. Thus, an exact estimation of the average internal temperature of the induction charging device and of the oscillator circuit is possible.

DETAILED DESCRIPTION

Figure 1:
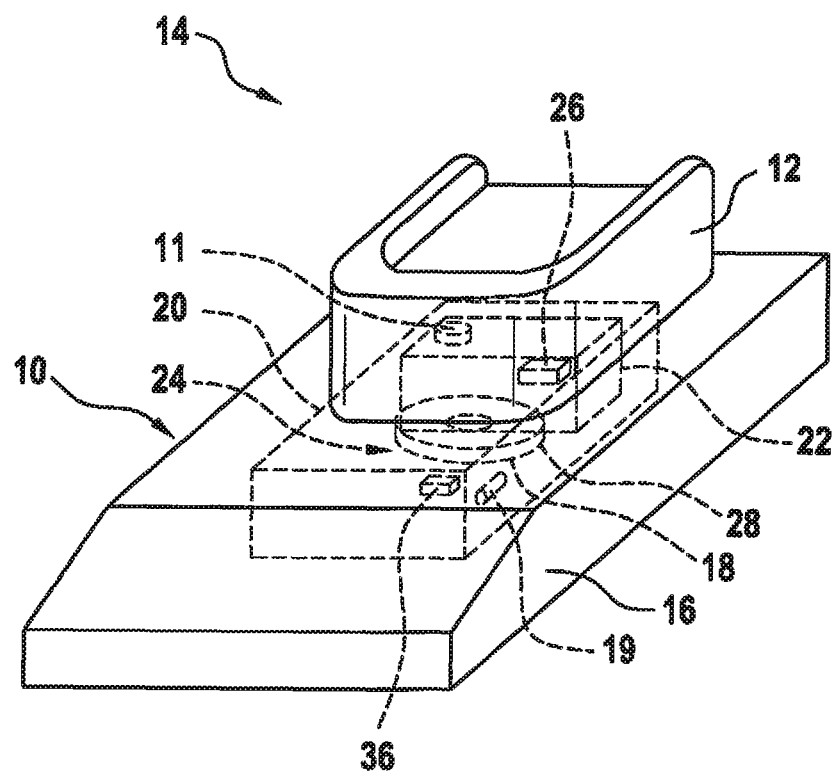
FIG. 1 shows an induction charging device for carrying out the method according to the present invention for foreign object detection and a rechargeable battery device to be charged in a schematic representation.

FIG. 1 shows an induction charging device 10 for carrying out the method according to the present invention for detecting a foreign object 11. FIG. 1 also shows a rechargeable battery device 12 to be charged for a hand-held power tool not shown. Induction charging device 10 forms the primary side of a charging system 14 and is provided to charge rechargeable battery device 12, which is designed as a hand-held power tool rechargeable battery or a hand-held power tool with integrated rechargeable battery. In principle, however, it would also be conceivable to charge other rechargeable battery devices that would be meaningful to those skilled in the art with induction charging device 10.

FIG. 1 shows induction charging device 10 and rechargeable battery device 12 to be charged in a charging operation. Rechargeable battery device 12 in this operation is placed on top of a housing 16 of induction charging device 10 and is wirelessly charged via at least one charge coil 18 of induction charging device 10. Induction charging device 10 includes a charging electronics unit 20, which in turn includes a control and regulating unit 22, as well as an oscillator circuit 24 having the at least one charge coil 18 and at least one capacitor 19, which is electrically connected to the at least one charge coil 18.

Control and regulating unit 22 of induction charging device 10 is provided to determine a resonance frequency $f_R$ and an associated actual quality $Q_f(f_R)$. In addition, control and regulating unit 22 is provided to compare the actual quality $Q_f(f_R)$ to a setpoint quality $Q_s(f_R)$ as a function of resonance frequency $f_R$. For this purpose, control and regulating unit 22 includes a memory 26, in which a relation table is stored, which contains a setpoint quality range $q_s$ having multiple setpoint qualities $Q_s(f_R)$ for the ascertained resonance frequency $f_R$ (cf. in this regard also the following explanations with respect to FIG. 2).

During a charging operation of induction charging device 10, a foreign object detection is carried out at regular intervals. During the foreign object detection, it is checked whether one or multiple foreign objects 11 which could impair a charging operation, are situated between induction charging device 10 and rechargeable battery device 12 or are only on top of induction charging device 10 and/or put an operator or induction charging device 10 at risk. The foreign object detection takes place in accordance with a method described in the unpublished German application DE 10 2013 212 588 in such a way that resonance frequency $f_R$ and associated actual quality $Q_f(f_R)$ are initially determined. Actual quality $Q_f(f_R)$ is then compared to setpoint quality $Q_s(f_R)$ as a function of resonance frequency $f_R$ in order to ultimately make a decision based on the defined setpoint quality range $q_s$ whether at least one foreign object 11 is present or not.

Figure 2:
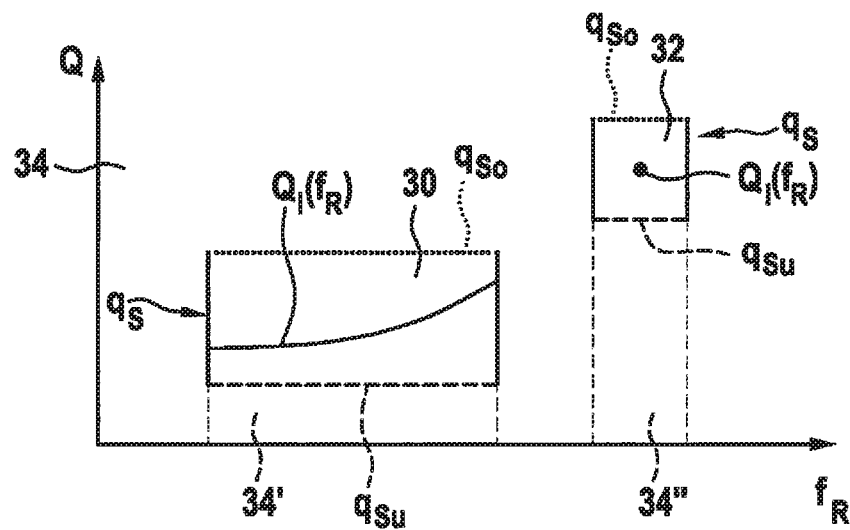
FIG. 2 shows a relation table of a control and regulating unit of the induction charging device according to the related art in the form of a schematic diagram.

FIG. 2 shows the relation table of control and regulating unit 22 stored in memory 26 in the form of a schematic diagram, in which resonance frequency $f_R$ is plotted on the x-axis and quality Q is plotted on the y-axis. The diagram is divided into three ranges 30, 32, 34. A first range 30 is formed by a setpoint quality range $q_s$ for an operation with rechargeable battery device 12. If actual quality $Q_f(f_R)$ is within an upper limit $q_{so}$ and a lower limit $q_{su}$ of range 30, it is assumed that no foreign object 11 is located in an area between induction charging device 10 and rechargeable battery device 12. It is further assumed that rechargeable battery device 12 rests on induction charging device 10 and is to be charged. A second range 32 is formed by a setpoint quality range $q_s$ for an operation without rechargeable battery device 12. If actual quality $Q_f(f_R)$ lies within upper limit $q_{so}$ and lower limit $q_{su}$ of range 32, it is assumed that no foreign object 11 is situated on induction charging device 10. It is further assumed that no rechargeable battery device 12 is situated on top of induction charging device 10.

A third range 34, which encloses first range 30 and second range 32, is formed by an error range. If actual quality $Q_f(f_R)$ is in this range 34, it is assumed that an arbitrary error is present or rechargeable battery device 12 is so poorly positioned relative to induction charging device 10 that a charging of rechargeable battery device 12 is not possible or possible only to a very limited extent. The error in this case may lie in induction charging device 10, in rechargeable battery device 12 as well as in the surroundings of charging system 14. Third range 34 includes two sub-ranges 34', 34". First sub-range 34' of third range 34 is situated below lower limit $q_{su}$ of first range 30 in relation to quality Q. If actual quality $Q_f(f_R)$ is within this first sub-range 34', it is assumed that at least one foreign object 11 is located in an area between induction charging device 10 and rechargeable battery device 12. Second sub-range 34" of third range 34 is situated below lower limit $q_{su}$ of second range 32 as related to quality Q. If actual quality $Q_f(f_R)$ is within this second sub-range 34", it is assumed that at least one foreign object 11 is situated on top of induction charging device 10.

However, the profile of actual quality $Q_f(f_R)$ is also a function, of, among other things, temperature influences. Thus, actual quality $Q_f(f_R)$ drops if internal temperature T of induction charging device 10 rises. Conversely, actual quality $Q_f(f_R)$ increases as temperature values fall. This may be attributed mainly to the fact that the internal resistance of charge coil 18 increases as temperature T increases and decreases as temperature T decreases. However, other components of oscillator circuit 24 such as, for example, capacitors, may also have a corresponding temperature influence on actual quality $Q_f(f_R)$. The temperature influences have an adverse impact on the accuracy of the foreign object detection. Thus, it is the object of the present invention to maintain actual quality $Q_f(f_R)$ largely independent of such temperature influences.

According to the present invention, induction charging device 10 includes a temperature sensor 36 (see FIG. 1), which is connected to control and regulating unit 22, and which detects internal temperature T of induction charging device 10 in the vicinity of the at least one charge coil 18. In order to obtain a preferably accurate estimation of average internal temperature T of induction charging device 10 and oscillator circuit 24, temperature sensor 36 is situated preferably neither directly on charge coil 18 nor in the direct vicinity of power switch elements, or other self-heating components of induction charging device 10. In this way, it is possible to largely minimize or avoid distorting temperature influences of these components on the temperature detection, so that primarily the influence of internal temperature T of induction charging device 10 produced by the at least one charge coil 18, which in addition is stabilized by the mass of charge coil 18, may be taken into consideration.

The method according to the present invention for foreign object detection provides that internal temperature T of induction charging device 10 is detected, in particular, during the wireless energy transmission, and measured actual quality $Q_f(f_R)$ is multiplied by a correction factor K based on internal temperature T. It is also provided to multiply upper limit $q_{so}$ and/or lower limit $q_{su}$ of setpoint quality range $q_s$ by the inverse 1/K of correction factor K. Correction factor K may be derived from the measured resistance of the at least one charge coil 18, since this correction factor—as previously mentioned—changes as a function of internal temperature T. Alternatively or in addition, it is possible to calculate correction factor K based on internal temperature T detected with temperature sensor 36.

Figure 3:
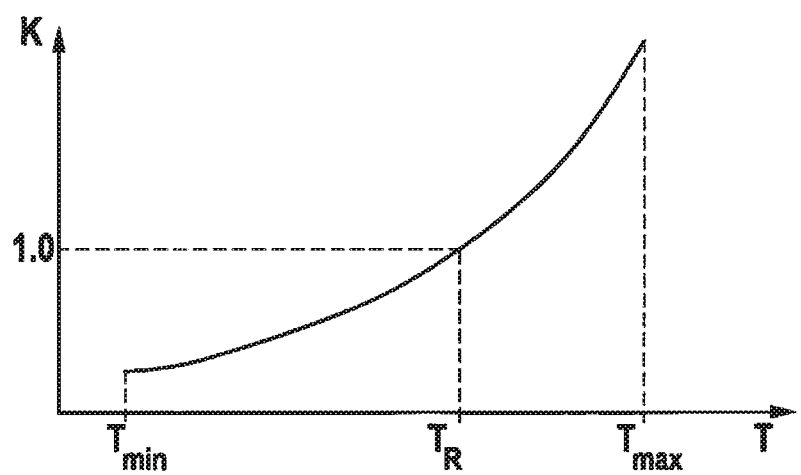
FIG. 3 shows a diagram of a first exemplary embodiment of the profile of a correction factor as a function of a detected internal temperature T of the induction charging device.

In FIG. 3, the profile of correction factor K is depicted as a function of internal temperature T. Correction factor K increases nonlinearly within the operating range defined by temperature limits $T_{min}$ and $T_{max}$ as internal temperature T increases. $T_R$ refers to an average room temperature of, for example, 25° C., in which correction factor K is standardized to value K=1.0. However, other values such as, for example, 23° C. or 24.5° C. may also be stored as room temperature $T_R$ within memory 26 of control and regulating unit 22.

Figure 4:
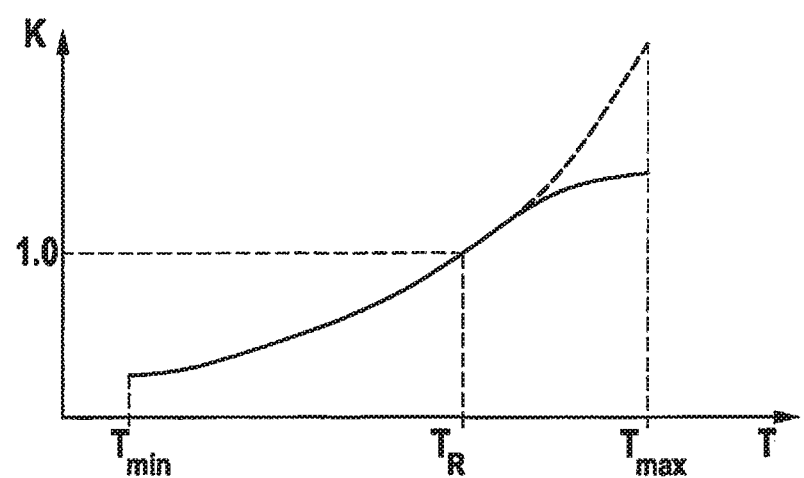
FIG. 4 shows a diagram of a second exemplary embodiment of the profile of the correction factor as a function of the detected internal temperature T of the induction charging device.

The sensitivity of the foreign object detection may be improved still further at higher values of internal temperature T via an adaptation of correction factor K according to FIG. 4. In this case, the profile of correction factor K corresponds to the profile from FIG. 3 up to somewhat above room temperature $T_R$. At higher temperature values, however, the profile of correction factor K up to maximum temperature value $T_{max}$ levels off relative to the original profile depicted with dashed lines, which effectuates a compensation to a somewhat lesser extent of the temperature influences actually detected on the one hand, but which results in increased accuracy of the foreign object detection on the other hand.

Lastly, it should be noted that the exemplary embodiments of the present invention shown are limited neither to the curve profiles shown in the figures nor to the design of the inductive charging system according to FIG. 1.

What is claimed is:

1. A method for foreign object detection for an induction charging device including an oscillator circuit, comprising:
   detecting a resonance frequency and an associated actual quality of the oscillator circuit;
   subsequently comparing the actual quality to a setpoint quality as a function of the resonance frequency;
   determining whether a foreign object is present based on a defined setpoint quality range;
   detecting an internal temperature of the induction charging device; and
   multiplying the actual quality by a correction factor based on the internal temperature,
   wherein a profile of the correction factor at higher internal temperatures above room temperature is leveled off relative to the detected temperature.

2. The method for foreign object detection as recited in claim 1, wherein the induction charging device is for a hand-held power tool.

3. The method for foreign object detection as recited in claim 1, wherein the detecting of the internal temperature is performed during a wireless energy transmission.

4. The method for foreign object detection as recited in claim 1, further comprising multiplying at least one of an upper limit and a lower limit of the setpoint quality range by an inverse of the correction factor.

5. The method for foreign object detection as recited in claim 1, further comprising:
   measuring a resistance of at least one charge coil; and
   deriving the correction factor from the measured resistance of the at least one charge coil.

6. The method for foreign object detection as recited in claim 1, further comprising calculating the correction factor based on the detected internal temperature.

7. The method for foreign object detection as recited in claim 1, wherein the correction factor for an average room temperature is standardized to a value of 1.0.

8. The method for foreign object detection as recited in claim 7, wherein the average room temperature is 25° C.

9. An induction charging device, comprising:
   an oscillator circuit;
   a control and regulating unit, wherein the control and regulating unit:
     detects a resonance frequency and an associated actual quality of the oscillator circuit,
     subsequently compares the actual quality to a setpoint quality as a function of the resonance frequency, and
     determines whether a foreign object is present based on a defined setpoint quality range; and
   at least one temperature sensor for detecting an internal temperature of the induction charging device, wherein the control and regulating unit multiplies the actual quality by a correction factor based on the internal temperature,
   wherein a profile of the correction factor at higher internal temperatures above room temperature is leveled off relative to the detected temperature.

10. The induction charging device as recited in claim 9, wherein the induction charging device is for a hand-held power tool.

11. The induction charging device as recited in claim 9, wherein the detecting of the internal temperature is performed during a wireless energy transmission.

12. The induction charging device as recited in claim 9, wherein the at least one temperature sensor is situated neither directly on a charge coil of the oscillator circuit nor directly in a vicinity of power switch elements and other self-heating components of the induction charging device.

* * * * *